United States Patent
Enomoto et al.

(10) Patent No.: US 8,814,278 B2
(45) Date of Patent: Aug. 26, 2014

(54) DRIVING-WHEEL SUPPORTING HUB UNIT AND ITS MANUFACTURING METHOD

(75) Inventors: Tatsuya Enomoto, Fujisawa (JP);
Nobuyuki Hagiwara, Fujisawa (JP);
Masahiro Yasumura, Fujisawa (JP)

(73) Assignee: NSK Ltd., Tokyo (JP)

( * ) Notice: Subject to any disclaimer, the term of this patent is extended or adjusted under 35 U.S.C. 154(b) by 809 days.

(21) Appl. No.: 12/295,169

(22) PCT Filed: Mar. 29, 2007

(86) PCT No.: PCT/JP2007/056988
§ 371 (c)(1),
(2), (4) Date: Sep. 29, 2008

(87) PCT Pub. No.: WO2007/119595
PCT Pub. Date: Oct. 25, 2007

(65) Prior Publication Data
US 2009/0045670 A1    Feb. 19, 2009

(30) Foreign Application Priority Data

Mar. 29, 2006 (JP) ................ 2006-090167
Sep. 22, 2006 (JP) ................ 2006-257112

(51) Int. Cl.
| | | |
|---|---|---|
| B60B 27/00 | (2006.01) | |
| F16C 43/04 | (2006.01) | |
| F16C 33/60 | (2006.01) | |
| F16C 19/18 | (2006.01) | |

(52) U.S. Cl.
CPC .............. *F16C 43/04* (2013.01); *F16C 33/605* (2013.01); *F16C 19/186* (2013.01); *B60B 27/0084* (2013.01); *F16C 2326/02* (2013.01)
USPC .................. 301/105.1; 384/544; 29/894.362

(58) Field of Classification Search
USPC ..................... 301/105.1; 29/894.36, 894.361, 29/894.362, 898, 898.045, 898.07; 384/544
See application file for complete search history.

(56) References Cited

U.S. PATENT DOCUMENTS

| | | | | |
|---|---|---|---|---|
| 6,485,187 | B1 * | 11/2002 | Meeker et al. ................ 384/537 |
| 6,772,615 | B2 * | 8/2004 | Hagiwara et al. ................ 72/67 |
| 6,996,907 | B2 * | 2/2006 | Toda et al. ............... 29/898.062 |
| 2001/0046339 | A1 | 11/2001 | Miyazaki et al. |
| 2003/0063827 | A1 * | 4/2003 | Webb et al. .................. 384/544 |
| 2004/0037482 | A1 | 2/2004 | Ouchi |
| 2008/0089628 | A1 * | 4/2008 | Kiuchi et al. ................ 384/544 |

FOREIGN PATENT DOCUMENTS

| | | |
|---|---|---|
| DE | 3418440 A1 | 11/1985 |
| JP | 9-164803 A | 6/1997 |
| JP | 10-196661 A | 7/1998 |
| JP | 2002-178706 A | 6/2002 |

* cited by examiner

*Primary Examiner* — Jason Bellinger
(74) *Attorney, Agent, or Firm* — Sughrue Mion, PLLC

(57) ABSTRACT

When an inner ring of a driving-wheel supporting hub unit is fixed to a hub, a pressing die is displaced downward and an annular working surface at a lower end surface of the pressing die is pressed against a front end of a cylindrical portion over its whole periphery. Further, in this state, the pressing die is pressed downward toward the hub without rocking the pressing die relative to the hub. Thus, the cylindrical portion is plastically deformed radially outward along the working surface simultaneously over its whole periphery. By adopting this method, the operation of plastically deforming the cylindrical portion at the inner end of the hub to form a caulking portion, can be easily and performed accurately. Accordingly, the structure of the caulking portion forming apparatus can be simplified.

2 Claims, 8 Drawing Sheets

DRIVING-WHEEL SUPPORTING HUB UNIT AND ITS MANUFACTURING METHOD

This application claims priority on Japanese Patent Application No. 2006-90167, filed on Mar. 29, 2006 and Japanese Patent Application No. 2006-257112, filed on Sep. 22, 2006, the contents of which are incorporated herein by reference.

TECHNICAL FIELD

The present invention relates to a driving-wheel supporting hub unit and its manufacturing method which rotatably supports driving wheels (front wheels of FF vehicles, rear wheels of FR vehicles and RR vehicles and all wheels of 4WD vehicles) of automobiles with respect to a suspension system and which are utilized to rotationally drive the driving wheels.

BACKGROUND ART

Driving wheels of an automobile are supported on a suspension system by a driving-wheel supporting hub unit. FIG. 8 shows the structure described in Patent Document 1, among such driving-wheel supporting units. This driving-wheel supporting hub unit rotatably supports a hub 2 and an inner ring 3 via a plurality of rolling elements 4 and 4 on the inner diameter side of an outer ring 1. Among these elements, the outer ring 1 does not rotate even during use, in a state where it is coupled with and fixed to a knuckle (not shown) constituting the suspension system. Moreover, first and second outer ring raceways 5 and 6 are provided at the inner circumferential surface of the outer ring 1 so as to rotatably support the hub 2 and the inner ring 3 on the internal diameter side of this outer ring 1 coaxially with the outer ring 1.

Hereinafter, with respect to an axial direction, "outer" indicates outside of a vehicle in its width direction in an assembled state to the vehicle. The "outer" indicates left side of FIG. 8 and lower side of FIGS. 1 to 5. On contrary, with respect to the axial direction, "inner" indicates the right side of FIG. 8 and the upper side of FIGS. 1 to 5 which become the central side of the vehicle in its width direction. These are all true in the present specification and the claims.

The hub 2 has a mounting flange 7 for supporting and fixing a vehicle wheel at a portion near an outer end of the outer circumferential surface, a first inner ring raceway 8 at an intermediate portion thereof, a small-diameter stepped portion 10 of which outer diameter becomes smaller than the portion where the first inner ring raceway 8 is formed at an inner end thereof and a spline hole 11 at a central portion. The inner ring 3 which has the second inner ring raceway 9 formed at its outer circumferential surface is fitted to the small-diameter stepped portion 10.

In addition, at the inner end of the inner circumferential surface of the inner ring 3, a large-diameter stepped portion 12 of which inner diameter becomes larger than the intermediate portion and the outer end is formed. Also, the inner end of the cylindrical portion 13 provided at the inner end of the hub 2 is plastically deformed to form a caulking portion 14 and a stepped surface 15 of the large-diameter stepped portion 12 is held by this caulking portion 14. As a result, the inner ring 3 is coupled with and fixed to the hub 2. The operation of plastically deforming the inner end of the cylindrical portion 13 radially outward as described above is performed by an orbital forging press. In this state, an inner end surface 16 of the inner ring 3 projects further axially inward than the caulking portion 14. Moreover, a plurality of rolling elements 4 and 4 are provided between the first and second outer ring raceways 5 and 6 and the first or second inner ring raceways 8 and 9, respectively.

When the driving-wheel supporting hub unit as mentioned above is assembled to an automobile, as shown in the drawing, a spline shaft 19 (driving shaft) provided in a central portion of an outer end surface 18 of an outer ring 17 for a constant-velocity joint is spline-engaged with the spline hole 11 of the hub 2. In addition, a radial outer end of the outer end surface 18 of the outer ring 17 for a constant-velocity joint is made to abut on the inner end surface 16 of the inner ring 3. In this state, a front end of the spline shaft 19 is screwed to a nut 20 and is further fastened. Thus, the hub 2 and the inner ring 3 are coupled with the spline shaft 19.

In such a conventional structure, the inner end surface of the caulking portion 14 is not made to abut on the outer end surface 18 of the outer ring 17 for a constant-velocity joint. For this reason, it is not necessary to finish the inner end surface of the caulking portion 14 into a flat surface perpendicular to a central axis. On the other hand, the inner end surface 16 of the inner ring 3 which is made to abut on the outer end surface 18 of the outer ring 17 for a constant-velocity joint is originally a flat surface perpendicular to the central axis. For this reason, it is not necessary to perform flattening again on the inner end surface 16 after the assembling of the hub unit. Accordingly, since such flattening can be omitted, the manufacturing cost of the driving-wheel supporting hub unit is reduced.

Meanwhile, in the aforementioned conventional technique, the caulking portion 14 is formed by an orbital forging press. Therefore, an apparatus to be used when the caulking portion 14 is formed becomes huge. This is because it is necessary to incorporate a mechanism which rocks the pressing die, a mechanism which prevents the hub unit from being swayed at the time of the operation of the orbital forging press, or the like into this apparatus. Anyway, if the apparatus becomes huge in this way, the manufacturing cost of the driving-wheel supporting hub unit increases.

On the other hand, a manufacturing method of forming the caulking portion 14 by hot forging is disclosed in Patent Document 2. Meanwhile, if the caulking portion 14 is formed by this hot forging in this way, the problems that, due to the heat generated during the hot forging, lubricating grease enclosed in a rolling-element setting portion deteriorates and thus the lifespan of the grease become short, or due to the heat, the inner end surface 16 of the inner ring 3 is distorted and it is thus difficult to make the contact pressure between the inner end surface 16 and the outer end surface 18 uniform over the whole periphery, may occur. Particularly when the working temperature of the caulking portion 14 exceeds a tempering temperature when the inner ring 3 is formed, a problem that the strength performance of this inner ring 3 degrades may occur. For this reason, the working temperature during cold forging as well as that of the hot forging becomes important.

Patent Document 1: Japanese Patent Unexamined Publication No. JP-A-9-164803
Patent Document 2: German Patent Unexamined Publication No. DE-A-3418440

DISCLOSURE OF THE INVENTION

Problem to be Solved by the Invention

The driving-wheel supporting hub unit and its manufacturing method of the invention have been invented in order to solve the aforementioned problems.

Means for Solving the Problem

Exemplary embodiments of the present invention include a driving-wheel supporting hub unit. The a hub, at an outer circumferential surface, having a flange for supporting a vehicle wheel at a portion near an outer end thereof; a first inner ring raceway at an intermediate portion thereof and a small-diameter stepped portion at an inner end thereof, an outer diameter of the small-diameter stepped portion becoming smaller than that of the first inner ring raceway. Exemplary embodiments also include an inner ring fitted to the small-diameter stepped portion and having a second inner ring raceway formed at an outer circumferential surface thereof. Exemplary embodiments also include an outer ring having a first outer ring raceway facing the first inner ring raceway and a second outer ring raceway facing the second inner ring raceway formed at an inner circumferential surface thereof and a plurality of rolling elements provided between the first and second inner ring raceways and the first and second outer ring raceways, respectively. In Exemplary embodiments, an inner end of an inner circumferential surface of the inner ring is provided with a large-diameter stepped portion of which inner diameter becomes larger than that of an intermediate portion of the inner circumferential surface or an inclined surface portion of which inner diameter becomes larger as axially inward, a stepped surface between the intermediate portion and the large-diameter stepped portion or the inclined surface portion is held by a caulking portion formed by plastically deforming a cylindrical portion provided at the inner end of the hub radially outward, whereby the inner ring is coupled with and fixed to the hub and an inner end surface of the inner ring is made to project further axially inward than an inner end surface of the caulking portion and the caulking portion is formed by pressing a pressing die axially toward the hub without rocking the pressing die with respect to the hub while an annular working surface provided in a portion of the pressing die is pressed against an inner end edge (a tip end) of the cylindrical portion over its whole periphery, under temperature conditions of cold working, thereby plastically deforming the cylindrical portion simultaneously over its whole periphery and axially outward along the working surface.

Other exemplary embodiments of a wheel supporting hub unit include a hub, at an outer circumferential surface, having: a flange for supporting a vehicle wheel at a portion near an outer end thereof. Exemplary embodiments also include a first inner ring raceway at an intermediate portion thereof and a small-diameter stepped portion at an inner end thereof, an outer diameter of the small-diameter stepped portion becoming smaller than that of the first inner ring raceway; an inner ring fitted to the small-diameter stepped portion and having a second inner ring raceway formed at an outer circumferential surface thereof. Exemplary embodiments further include an outer ring having: a first outer ring raceway facing the first inner ring raceway and a second outer ring raceway facing the second inner ring raceway formed at an inner circumferential surface thereof and a plurality of rolling elements provided between the first and second inner ring raceways and the first and second outer ring raceways, respectively. In the exemplary embodiments, an inner end of an inner circumferential surface of the inner ring is provided with a large-diameter stepped portion of which inner diameter becomes larger than that of an intermediate portion of the inner circumferential surface, a stepped surface between the intermediate portion and the large-diameter stepped portion is held by a caulking portion formed by plastically deforming a cylindrical portion provided at the inner end of the hub radially outward, whereby the inner ring is coupled with and fixed to the hub and an inner end surface of the inner ring is made to project further axially inward than an inner end surface of the caulking portion and the caulking portion is formed by plastically deforming the cylindrical portion axially outward under temperature conditions of cold working near and an outer circumferential edge (including outer circumferential surface) of the caulking portion does not contact with an inner circumferential surface of the large-diameter stepped portion.

Yet other exemplary embodiments include methods of manufacturing a driving supporting hub unit. Exemplary embodiments may include forming, at an inner end of an inner circumferential surface of the inner ring, a large-diameter stepped portion of which inner diameter becomes larger than that of an intermediate portion of the inner circumferential surface or an inclined surface portion of which inner diameter becomes larger as axially inward and pressing a pressing die axially toward the hub without rocking the pressing die with respect to the hub while an annular working surface provided in a portion of the pressing die is pressed against an inner end edge of a cylindrical portion provided at an inner end of the hub over its whole periphery, under temperature conditions of cold working, whereby the cylindrical portion is plastically deformed simultaneously over its whole periphery and axially outward along the working surface and a stepped surface portion between the intermediate portion and the large-diameter stepped portion or the inclined surface is held by a caulking portion formed by the plastic deforming, whereby the inner ring is coupled with and fixed to the hub in a state where an inner end surface of the inner ring is made to project further axially inward than an inner end surface of the caulking portion.

Additional exemplary embodiments include forming, at the inner end of the hub, a cylindrical portion adapted such that its projection distance which projects axially inward from a stepped surface between the intermediate portion and the large-diameter stepped portion is smaller than the radial dimension of the stepped surface in a state where the inner ring is fitted to the small-diameter stepped portion and plastically deforming the cylindrical portion axially outward under temperature conditions of cold working and holding the stepped surface by a caulking portion formed by the plastic deforming, whereby the inner ring is coupled with and fixed to the hub in a state where an inner end surface of the inner ring is made to project further axially inward than an inner end surface of the caulking portion and an outer circumferential edge (including an outer circumferential surface) of the caulking portion does not contact an inner circumferential surface of the large-diameter stepped portion.

Here, when exemplary embodiments of the invention are carried out, an orbital forging press can be adopted. The method by an orbital forging press is a method in which, rocking the pressing die with respect to the hub while the pressing a circumferentially part of a ring-shaped machining surface provided at a part of the pressing die against a circumferentially part of the inner edge of the cylindrical portion; and moving the pressing position of the machining surface relative to the inner edge of the cylindrical portion in the circumferential direction while pressing the pressing hub against the hub, the cylindrical portion is plastically deformed radially outwardly along with the machining surface continuously in the circumferential direction.

Advantage of the Invention

As described above, in the driving-wheel supporting hub unit and its manufacturing method of the invention, when the caulking portion is formed, the pressing die does not rock with respect to the hub, instead, the pressing die is linearly pressed axially toward the hub. For this reason, it is not necessary to incorporate a mechanism which rocks the pressing die, a mechanism which prevents the hub unit from being swayed at the time of forming the caulking portion, or the like into an apparatus which is used when the caulking portion is formed. Accordingly, an apparatus to be used when the caulking portion is formed can be prevented from becoming huge. As a result, the manufacturing cost of the driving-wheel supporting hub unit can be reduced.

In addition, in the invention, the formation operation of the caulking portion is formed under temperature conditions of cold working. Therefore, unless severe working conditions, such as adding excessive working load, are not set, the temperature of the caulking portion can be prevented from rising excessively (for example, such that the temperature exceeds the tempering temperature of the inner ring) during the formation of the caulking portion. Accordingly, occurrence of problems such that, due to the temperature (heat) during working, lubricating grease enclosed in a rolling-element setting portion deteriorates, the inner end surface of the inner ring is distorted, or the strength performance of the inner ring degrades, can be prevented.

Further, as described above, in the driving-wheel supporting hub unit and its manufacturing method of the invention, the outer circumferential edge of the caulking portion and the inner circumferential surface of the large-diameter stepped portion do not contact each other in a state where the caulking portion is formed. For this reason, since the contact area between the caulking portion and the inner ring can be made small, it becomes possible that the heat generated in this caulking portion during working hardly transferred to the inner ring. Accordingly, occurrence of problems such that, due to the heat generated in the caulking portion during working, lubricating grease enclosed in a rolling-element setting portion deteriorates, the inner end surface of the inner ring is distorted, or the strength performance of the inner ring degrades, can be more effectively prevented. In addition, by employing a construction in which the outer circumferential edge of the caulking portion and the inner circumferential surface of the large-diameter stepped portion do not contact each other, the caulking portion becomes small. Thus, the working load of the caulking portion can be made small.

REFERENCE NUMERALS

1: OUTER RING
2: HUB
3: INNER RING
4: ROLLING ELEMENT
5: FIRST OUTER RING RACEWAY
6: SECOND OUTER RING RACEWAY
7: MOUNTING FLANGE
8: FIRST INNER RING RACEWAY
9: SECOND INNER RING RACEWAY
10: SMALL-DIAMETER STEPPED PORTION
11: SPLINE HOLE
12: LARGE-DIAMETER STEPPED PORTION
13, 13a to 13c: CYLINDRICAL PORTION
14, 14a: CAULKING PORTION
15: STEPPED SURFACE
16: INNER END SURFACE
17: OUTER RING FOR CONSTANT-VELOCITY JOINT
18: OUTER END SURFACE
19: SPLINE SHAFT
20: NUT
21: CAULKING PORTION FORMING APPARATUS
22: LOWER DIE
23: GUIDE MEMBER
24, 24a: PRESSING DIE
25: SUPPORTING TUBULAR PORTION
26: RECESSED HOLE
27: WORKING SURFACE
28: CONCAVE CURVED SURFACE
29: TAPERED SURFACE PORTION
30: HOLDING EDGE
31, 31a: SECOND SMALL-DIAMETER STEPPED PORTION
32: STEPPED SURFACE
33: CONTINUOUS PORTION
34: FIRST TAPERED SURFACE PORTION
35: SECOND TAPERED SURFACE PORTION
36: JIG
37: R CHAMFERING PORTION
38: CORNER R PORTION
39: R CHAMFERING PORTION
40: R CHAMFERING PORTION (C CHAMFERING PORTION)
41: CONCAVE CURVED SURFACE
42: TAPERED SURFACE PORTION
43: STEPPED SURFACE
44: OUTER END SURFACE

PREFERRED EMBODIMENTS FOR CARRYING OUT THE INVENTION

Figure 1:
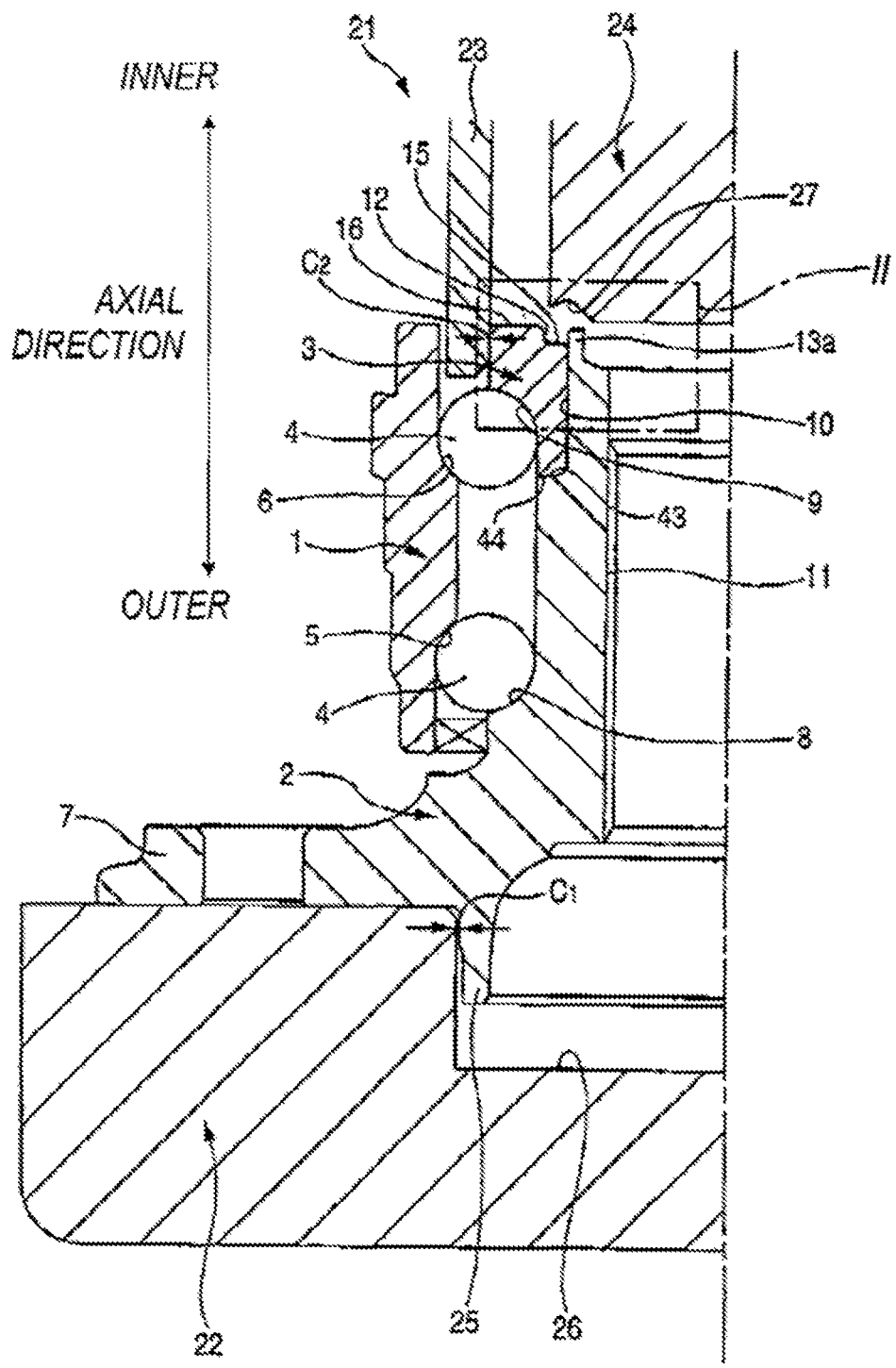
FIG. 1 is a sectional view showing a state in which a driving-wheel supporting hub unit is set in a caulking portion forming apparatus, in one example of an embodiment of the invention.
Figure 2:
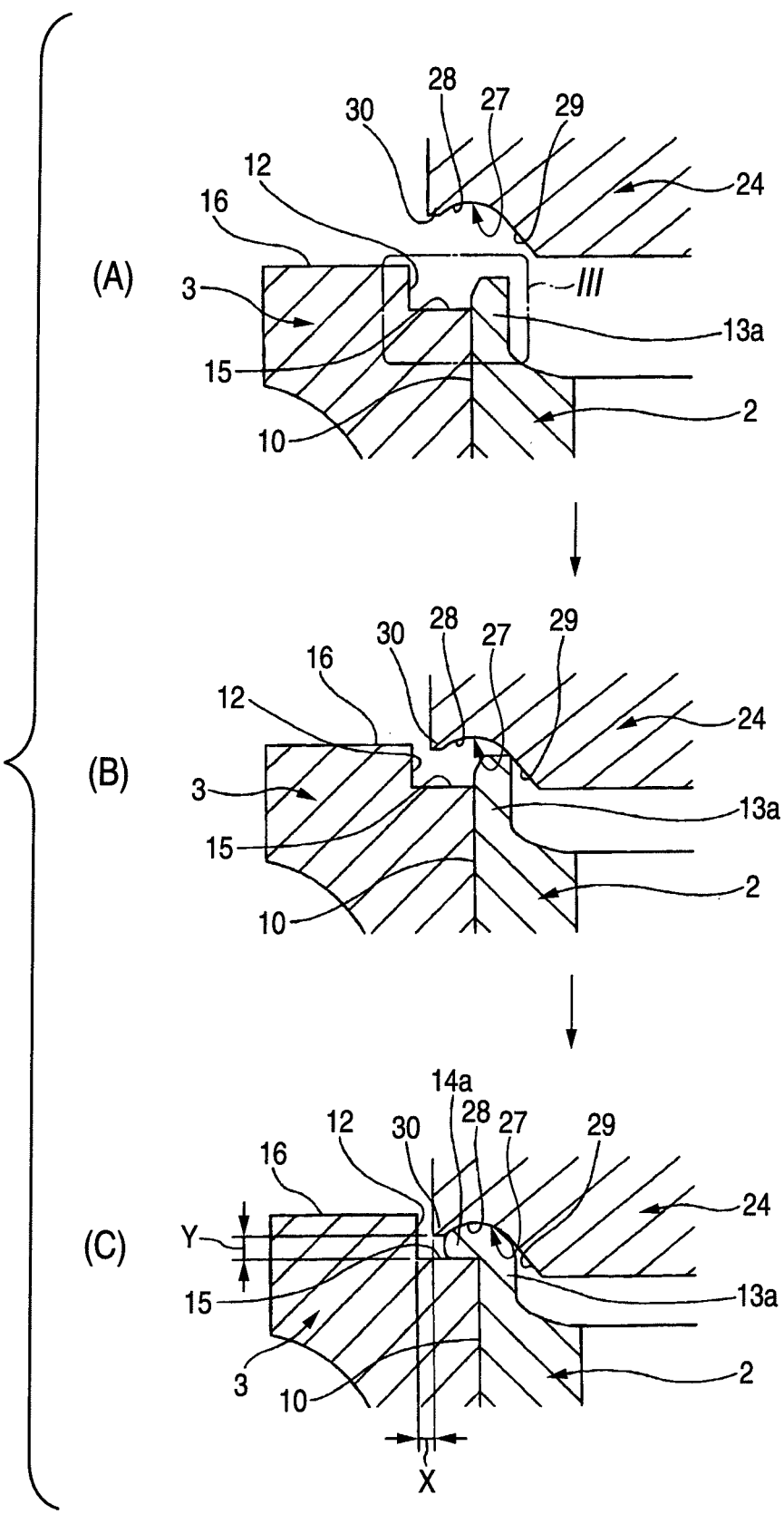
FIG. 2 is an enlarged sectional view equivalent to a portion II of FIG. 1, showing the operation of forming a caulking portion by a pressing die in the order of processes.
Figure 3:
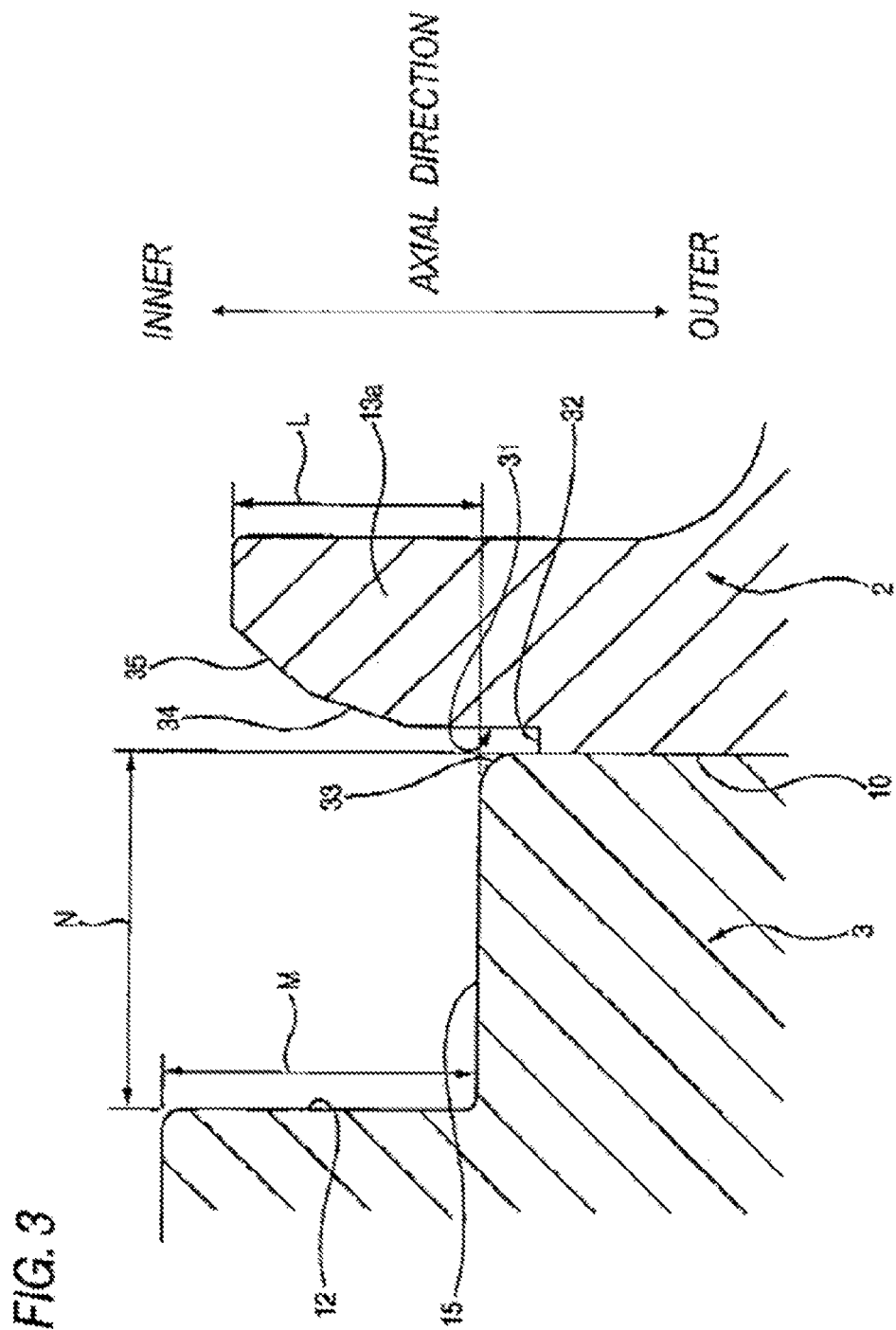
FIG. 3 is a enlarged view of a portion III of FIG. 2.
Figure 8:
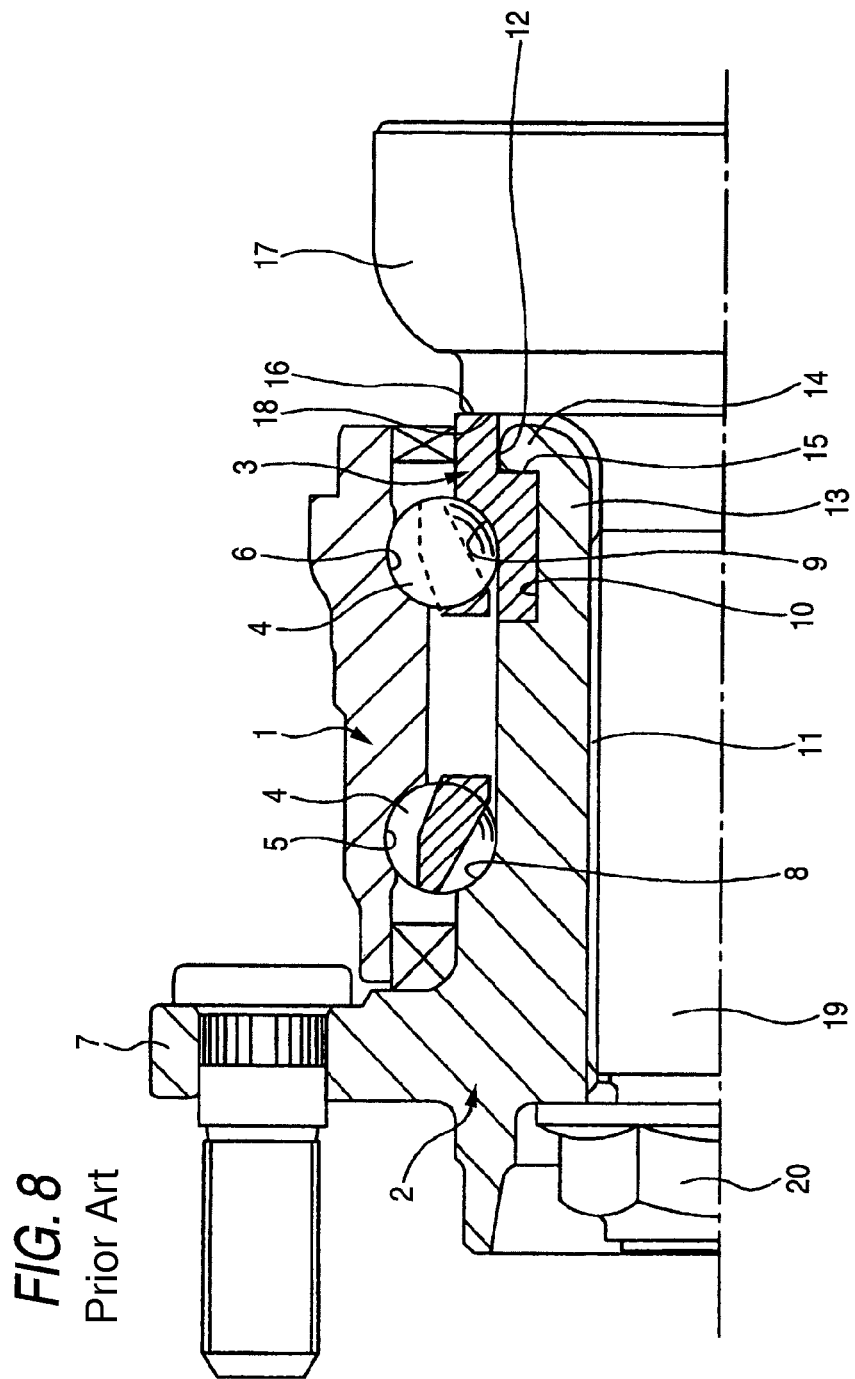
FIG. 8 is a half sectional view showing a state where a spline shaft of a constant-velocity joint is coupled with a conventional driving-wheel supporting hub unit.

FIGS. 1 to 3 illustrate one example of an embodiment of the invention. In addition, the feature of this example lies in the fact that a forming method of a caulking portion 14a and the shape before and after the formation of the caulking portion 14a have been contrived. The basic structure of a driving-wheel supporting hub unit to be targeted is almost the same as the aforementioned conventional structure shown in FIG. 8 except for the shape before and after the formation of the caulking portion 14a. For this reason, the same reference numerals will be given to equivalent portions and duplicate illustration and description will be omitted or simplified. Hereinafter, characterizing portions of this example and portions different from the conventional structure will be described mainly.

In this embodiment, prior to forming the caulking portion 14a, first, as shown in FIG. 1, an outer ring 1, a hub 2 and an inner ring 3 which constitute the driving-wheel supporting hub unit and a plurality of rolling elements 4 and 4 are assembled mutually. In this state, an inner end of a cylindrical portion 13a provided at an inner end of the hub 2 projects further axially inward than a stepped surface 15 of a large-diameter stepped portion 12 provided at an inner circumferential surface of the inner ring 2. Then, the driving-wheel supporting hub unit assembled in this way, as shown in FIG. 1, is set in the caulking portion forming apparatus 21. The caulking portion forming apparatus 21 includes a lower die (receiving table) 22, a cylindrical guide member 23 and a pressing die 24, which are arranged coaxially with one another.

When the driving-wheel supporting hub unit is set in such a caulking portion forming apparatus 21, first, as shown in FIG. 1, the cylindrical supporting tubular portion 25 provided at an outer end of the hub 2 is inserted into a circular recessed hole 26 formed in a central portion of an upper surface of the lower die 22. Along with this, a mounting flange 7 provided in a portion near the hub 2 is placed at a surrounding portion of the recessed hole 26 in the upper surface of the lower die 22. Next, a lower end of the guide member 23 is inserted and fitted to an outer circumferential surface of an inner end of the inner ring 3 from above.

Here, in this embodiment, in this state, the clearance $C_1$ (a radial clearance dimension in a concentric arrangement state) between an outer circumferential surface of the supporting tubular portion 25 and an inner circumferential surface of the recessed hole 26 and the clearance $C_2$ between an outer circumferential surface of an inner end of the inner ring 3 and an inner circumferential surface of an inner end of the guide member 23 are set so as to be small values of about 0.01 to 0.2 mm. As a result, the alignment between the hub 2 and the pressing die 24 can be performed precisely. However, if such alignment is performed when the invention is carried out, a construction in which the guide member 23 is not provided, or a construction in which only the clearance $C_2$ on the side of the guide member 23 of both the clearances $C_1$ and $C_2$ is controlled to a small value can also be adopted. In addition, such an alignment method and such numerical control of clearances can also be applied to a case where the caulking portion 14a is formed by an orbital forging press.

Anyway, next, an annular working surface 27 provided at a lower end surface of the pressing die 24 is made to axially face an inner end edge of the cylindrical portion 13a, which is provided at the inner end of the hub 2, over its whole periphery. The working surface 27 is formed by smoothly and continuously forming an inner circumferential end of an annular concave curved surface 28 which is provided at a radial intermediate portion to an outer end and matches an inner end surface of the caulking portion 14a after completion and an outer circumferential end of a tapered surface portion 29 which is provided at a radial inner end and the external diameter of which becomes small downward, in a state where mutual tangential directions at a continuous portion are made to coincide with each other.

Moreover, the surface of such a working surface 27 is provided with a superhard coating layer with a low coefficient of friction, such as diamond-like carbon (DLC) or Ti. As a result, the hardness of the working surface 27 is sufficiently secured and the coefficient of friction of the working surface 27 is made sufficiently small. In addition, a holding edge 30 which projects further downward than the bottom of the concave curved surface 28 over its whole periphery is provided at an outer circumferential edge (surrounding portion of the working surface 27) of the lower end surface of the pressing die 24.

If the driving-wheel supporting hub unit has been set in the caulking portion forming apparatus 21 as mentioned above, next, under the temperature conditions of cold working, as shown in (A)→+(B) of FIG. 2, the pressing die 24 is displaced downward and the working surface 27 is pressed against the inner end edge of the cylindrical portion 13a over its whole periphery. Moreover, in this state, as shown in (B)→(C) of FIG. 2, the pressing die 24 is pressed downward toward the hub 2 without rocking the pressing die 24 with respect to the hub 2 (that is, the pressing die 24 is moved axially linearly). As a result, the cylindrical portion 13a is plastically deformed radially outward along the working surface 27 simultaneously over its whole periphery. Also, the portion which is plastically deformed radially outward in this way is used as the caulking portion 14a and the stepped surface 15 of the large-diameter stepped portion 12 provided at the inner circumferential surface of the inner ring 3 is held by this caulking portion 14a.

In addition, in this embodiment, the pressing force of the pressing die 24 to the cylindrical portion 13a (caulking portion 14a) is set to about 196 to 490 kN (20 to 50 tf) grade. Here, this pressing force is preferably controlled to 294 kN (30 tf). This is because the deformation around a bearing portion based on an excessive pressing force is prevented and a temperature rise during working is suppressed. Moreover, in this embodiment, the operation of forming the caulking portion 14a as mentioned above is performed while a portion between the surface of cylindrical portion 13a (caulking portion 14a) and the working surface 27 is lubricated. As a result, occurrence of any damage, such as cracking, in the surface of the cylindrical portion 13a (caulking portion 14a) is prevented and a temperature rise during working is suppressed.

In addition, in this embodiment, as shown in detail in FIG. 3, a second small-diameter stepped portion 31 is provided at the inner end of the outer circumferential surface of the cylindrical portion 13a before the caulking portion 14a is formed. As a result, when the caulking portion 14a is formed as mentioned above, an axial inner half of the cylindrical portion 13a is adapted so as to be easily plastically deformed axially outward with a stepped surface 32 of the second small-diameter stepped portion 31 as a starting point.

Here, the stepped surface 32 of the second small-diameter stepped portion 31, as shown in the drawing, may be provided more axially outside (lower side of FIG. 3) than, more axially inside (upper side of FIG. 3) than, or in the same axial portion as an R chamfering portion (rounded portion) 33 provided in a continuous portion between the inner circumferential surface of the inner ring 3 and the stepped surface 15 of the large-diameter stepped portion 12. However, a construction, in which the stepped surface is more axially outside than the chamfering portion as shown in the drawing, can improve the adhesion of the caulking portion 14a to the stepped surface 15 of the large-diameter stepped portion 12.

In addition, in this embodiment, a first tapered surface portion 34 of which gradient (a ratio which becomes smaller in external diameter toward the inner end) is relatively small is continuously provided in the portion near an inner end of the second small-diameter stepped portion 31 and similarly, a second tapered surface portion 35 of which gradient is relatively large is continuously provided at the inner end. As a result, a stress is prevented from being concentrated on the portions corresponding to the portions where the tapered surface portions 34 and 35 are formed, during or after the formation of the caulking portion 14a.

In addition, in this embodiment, as shown in detail in FIG. 3, in the state where the inner ring 3 is fitted to the small-diameter stepped portion 10 of the hub 2, the axially inward projection length L of the cylindrical portion 13 from the stepped surface 15 of the large-diameter stepped portion 12 is set to be smaller than the axial dimension M of the large-diameter stepped portion 12 and the radial direction N of the stepped surface 15 (L<M, L<N). As a result, as shown in (C) FIG. 2, the outer circumferential edge (outer circumferential surface) of the caulking portion 14a after formation does not contact the inner circumferential surface of the large-diameter stepped portion 12, i.e., the outer circumferential edge faces the inner circumferential surface of the large-diameter stepped portion 12 with a clearance therefrom. In addition, as long as the outer circumferential surface can avoid contacting the inner circumferential edge of the large-diameter stepped portion, the projection length L may be set to be slightly larger than the axial dimension M (L>M).

Anyway, the contact area between the caulking portion 14a and the inner ring 3 is made small by adopting such a construction. Thus, the heat generated in the caulking portion 14a during working is hardly transmitted to this inner ring 3. Along with this, the working load when the caulking portion 14a can be made small by making the caulking portion 14a after formation relatively small. The above effects are obtained even when the caulking portion 14a is formed by an orbital forging press.

Here, as mentioned above, in this embodiment, the caulking portion 14a to be formed becomes relatively small. Therefore, even if the aforementioned second small-diameter stepped portion 31 is provided, the cylindrical portion 13a can be plastically deformed radially outward. Accordingly, the second small-diameter stepped portion 31 is not necessarily provided. Here, if the second small-diameter stepped portion 31 is provided, as well as the aforementioned effects can be obtained and in addition to these effects, the effect that the operation of fitting the inner ring 3 on the small-diameter stepped portion 10 of the hub 2, using the second small-diameter stepped portion 31 as a guide portion, becomes easy can be obtained.

Moreover, in this embodiment, in a state shown in (C) of FIG. 2, the shapes and the dimensions of individual portions are controlled such that the contact area between the caulking portion 14a and the working surface 27 becomes larger than the contact area between the caulking portion 14a and the stepped surface 15 of the large-diameter stepped portion 12. As a result, the heat generated during working of the caulking portion 14a easily dissipates to the outside through the pressing die 24.

Moreover, in this embodiment, in a state shown in (C) of FIG. 2, the clearance X between the outer circumferential surface of the holding edge 30 provided at the lower end surface of the pressing die 24 and the large-diameter stepped portion 12 and the clearance Y between a leading surface of the holding edge 30 and the stepped surface 15 of the large-diameter stepped portion 12 are set to be about 0.1 to 1.0 mm. As a result, a stress is prevented from being concentrated on a portion of the caulking portion 14a, during or after the formation of the caulking portion 14a.

In addition, although not shown, as shown in (C) of FIG. 2, the construction in which a portion of the pressing die 24 abuts against the inner end surface 16 of the inner ring 3 at the time of the completion of the caulking portion 14a can also be adopted. If such a construction is adopted, positioning of the pressing die 24 at the time of the completion of the caulking portion 14a can be performed and the surface precision of the inner end surface 16 of the inner ring 3 can be improved.

In addition, in this embodiment, in a state where the caulking portion 14a is formed as mentioned above, an axial force ranging from 4.9 to 19.6 kN (500 kgf to 2 tf) is set to be applied to an abutting portion between a stepped surface 43 which exists at a base end edge of the small-diameter stepped portion 10 of the hub 2 and the outer end surface 44 of the inner ring 3. This reason is as follows. That is, when the driving-wheel supporting hub unit after completion is assembled to a vehicle body, the inner ring 3 is axially pressed by the outer ring 17 for a universal joint (refer to FIG. 8), whereby proper preload is given to each of the rolling elements 4 and 4. Here, even when the driving-wheel supporting hub unit is a single body before being assembled to a vehicle body, a sufficient axial force preferably acts on the abutting portion between the stepped surface 43 and the outer end surface 44 of the inner ring 3 if it is taken into consideration that the rigidity of the hub unit is sufficiently secured.

It is desirable that such axial force before assembling to a vehicle body has a positive value even if extremely small. In this case, by taking into account of fluctuations (it is considered so that a clearance may be created and the axial force may not become completely zero), the axial force is preferably 4.9 kN (500 kgf) or more. On the other hand, if the axial force is made larger than 19.6 kN (2 tf), it is necessary to excessively increase the caulking portion 14a and working of the caulking portion 14a becomes troublesome. Therefore, this is not preferable. For this reason, in this embodiment, the setting value (an average value when a plurality of completed articles are taken out) of the axial force is set to a value within a range of 4.9 to 19.6 kN (500 kgf to 2 tf).

As described above, in the driving-wheel supporting hub unit and its manufacturing method of this example, when the caulking portion 14a is formed, the pressing die 24 is not be rocked with respect to the hub 2, but the pressing die 24 is linearly pressed axially toward the hub 2. For this reason, it is not necessary to incorporate a mechanism which rocks the pressing die 24, a mechanism which prevents the hub unit from being swayed at the time of the formation of the caulking portion 14a, or the like into the caulking portion forming apparatus 21. Accordingly, the caulking portion forming apparatus 21 can be prevented from becoming huge. As a result, the manufacturing cost of the driving-wheel supporting hub unit can be reduced.

Moreover, in this embodiment, the operation of forming the caulking portion 14a is performed under the temperature conditions of cold working and the heat dissipation property of the caulking portion 14a is improved. For this reason, occurrence of such problems that, due to the heat generated during the formation of the caulking portion 14a, lubricating grease enclosed in a rolling-element setting portion deteriorates, the inner end surface 16 of the inner ring 3 is distorted, or the strength performance of the inner ring 3 degrades, can be prevented effectively.

Figure 4:
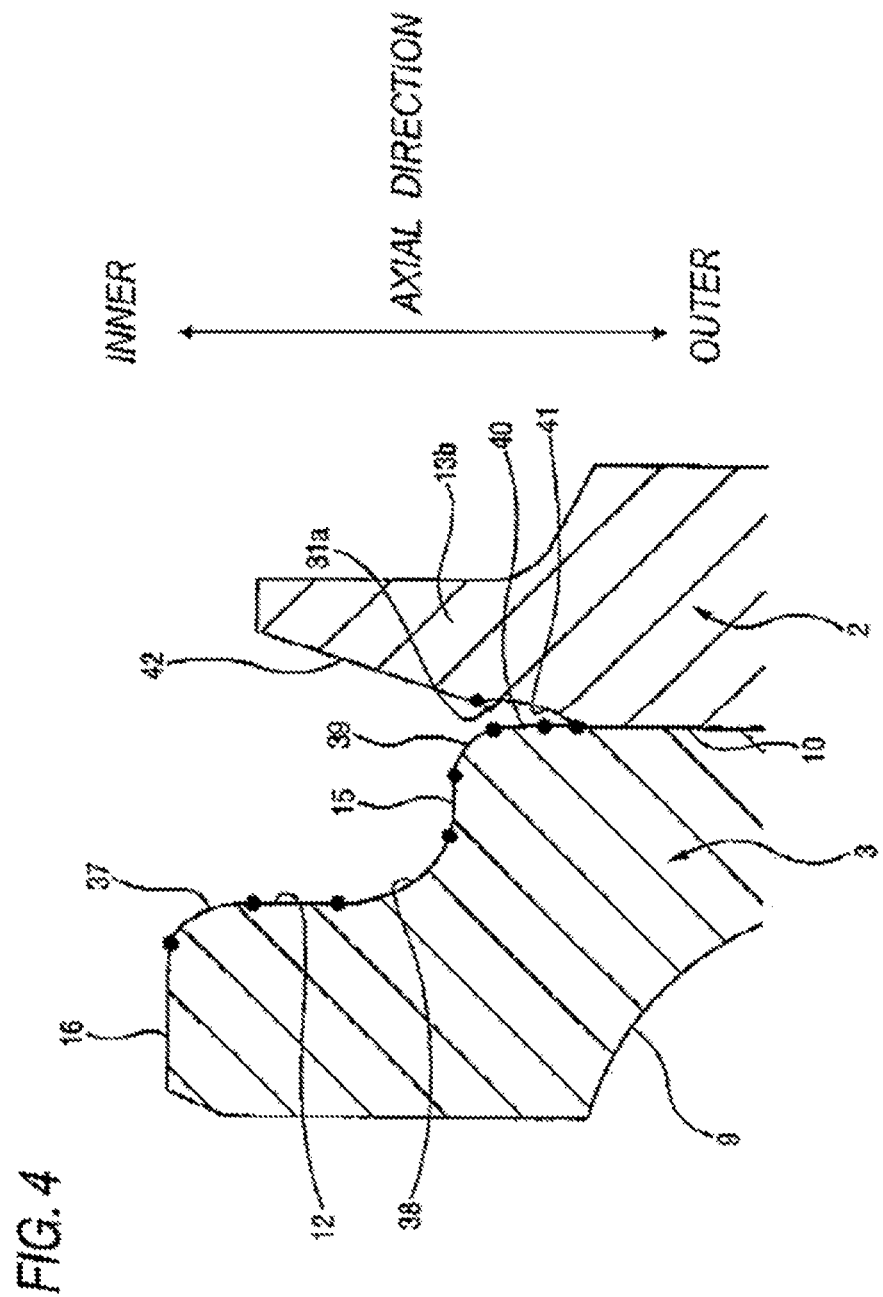
FIG. 4 is a view similar to FIG. 3, showing a first example of other shapes of a hub and an inner end of an inner ring before the caulking portion is formed, which can be adopted when the invention is carried out.

In addition, when the invention is carried out, the axial inner ends of the hub 2 and the inner ring 3 before forming the caulking portion, can be formed, for example, in the shape as shown in FIG. 4. If the shape is made as shown in FIG. 4, an R chamfering portion (rounded portion) 37 whose radius of curvature is relatively large is provided on a continuous portion between the inner end surface 16 of the inner ring 3 and the large-diameter stepped portion 12; a corner R portion 38 whose radius of curvature is relatively large is provided on a continuous portion between the large-diameter stepped portion 12 and the stepped surface 15; and R chamfering portion 39 whose radius of curvature is relatively small and an R chamfering portion 40 (or a C chamfering portion whose sectional shape is linear) whose radius of curvature is very large are provided on a continuous portion between the stepped surface 15 and the inner circumferential surface of the inner ring 3.

In addition, the stepped surface 15 is located more axially inside than a second inner ring raceway 9 formed at the outer circumferential surface of the inner ring 3 similarly to the aforementioned embodiment. Further, the second small-diameter stepped portion 31a formed at outer circumferential surface of the axial inner half of the cylindrical portion 13b is formed such that its axial outer end becomes an annular concave curved surface 41 in a circular-arc section and its axial intermediate portion to axial inner end become a tapered surface portion 42 of which outer diameter becomes smaller axially inward.

Here, black points in FIG. 4 represent boundary positions of the individual portions 37 to 42. The tapered surface portion 42 can also be formed into a two-stage taper like the aforementioned embodiment. Other constructions and operations are the same as those of the aforementioned embodiment.

Figure 5:
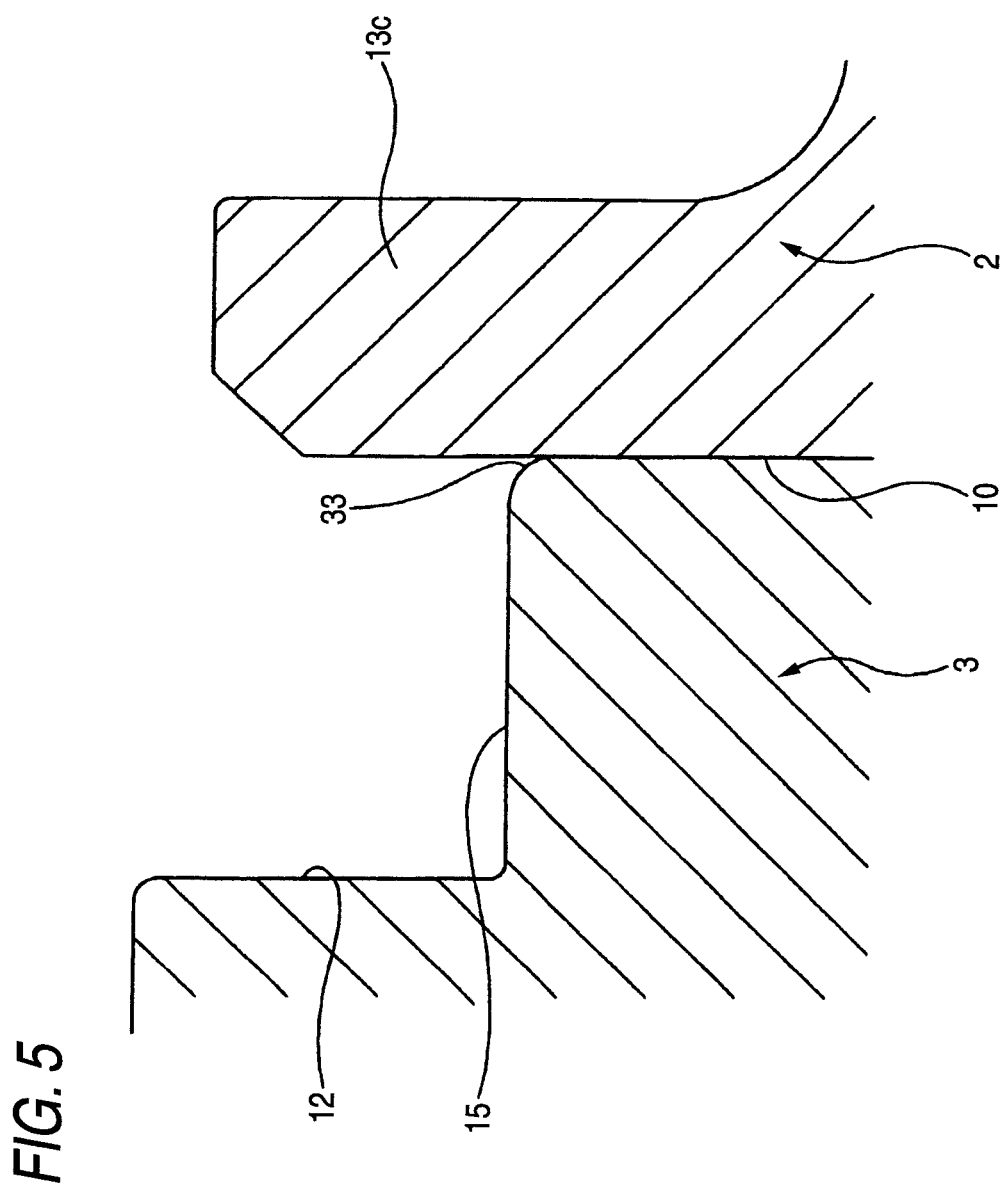
FIG. 5 is a view similar to FIG. 3, showing a second example of the above other shapes.

In addition, when the invention is carried out as mentioned above, for example, as shown in FIG. 5, it is possible to adopt a structure in which the second small-diameter stepped portion is not formed at the outer circumferential surface of the axial inner half of the cylindrical portion 13c of the hub 2 before forming the caulking portion. If such a structure is adopted, the cylindrical portion 13c is plastically deformed along the R chamfering portion 33 provided at an inner circumferential portion of the stepped surface 15 of the inner ring 3. As a result, an axial force is easily applied to the abutting portion between the stepped surface 43 which exists at the base end edge of the small-diameter stepped portion 10 of the hub 2 and the outer end surface 44 (refer to FIG. 1) of the inner ring 3. Other constructions and operations are the same as those of the aforementioned embodiment.

Moreover, when the invention is carried out, as the caulking portion is formed by plastically deforming the cylindrical portion provided at the inner end of the hub, a problem that the inner circumferential surface (including spline holes) of the hub is deformed may be caused. As the method of solving such a problem, for example, a method of performing machining (broaching) on an inner circumferential surface of the hub after forming the caulking portion, thereby correcting the deformation of the inner circumferential surface is conceivable. On the other hand, as the method of preventing occurrence of the problem as mentioned above, for example, a method of inserting or press-fitting (including spline coupling) a jig into the inner circumferential surface of the hub without rattling when forming the caulking portion, thereby preventing deformation of the inner circumferential surface is conceivable.

Figure 6:
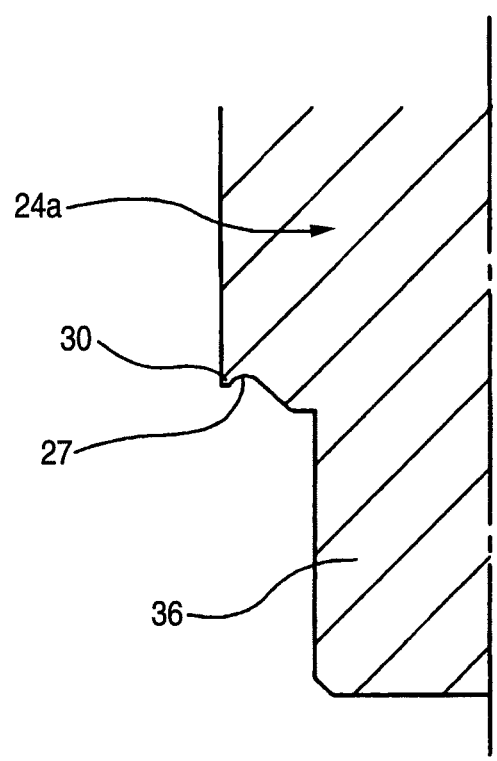
FIG. 6 is a half sectional view showing another example of the pressing die which can be used when the invention is carried out.

When this kind of method is adopted, for example, as shown in FIG. 6, a jig 36 to be inserted or press-fitted (including spline coupling) into the inner circumferential surface of the hub can be formed integrally with a central portion of the lower end surface of the pressing die 24a. If such a pressing die 24a is used, as well as occurrence of the problem as described above can be prevented, the alignment between the pressing die 24a and the hub can be performed more accurately. For this reason, the force is uniformly applied to the cylindrical portion (caulking portion) over its whole periphery from the working surface 27. Furthermore, the squareness between the inner circumferential surface of the hub and the inner end surface of the inner ring can also be improved.

Figure 7:
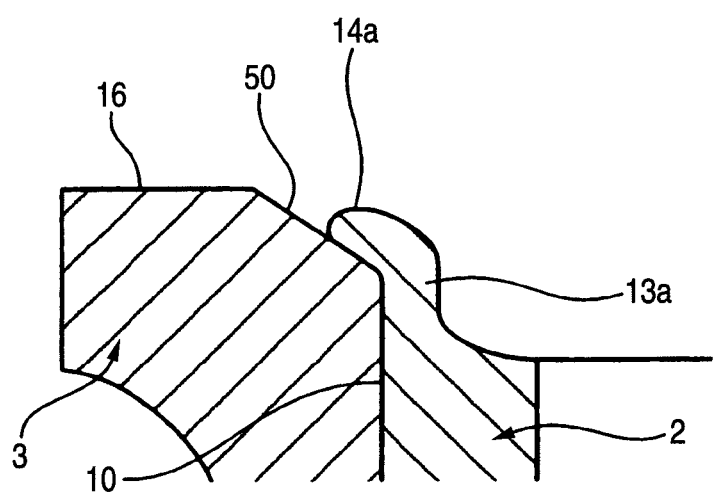
FIG. 7 is a view showing other shapes of the inner end of the inner ring when the invention is carried out.

Moreover, instead of providing the inner end of the inner circumferential surface of the inner ring 3 with the large-diameter stepped portion 12 of which inner diameter becomes larger than an intermediate portion of the inner circumferential surface, as shown in FIG. 7, an inclined surface portion 50 of which inner diameter becomes larger axially inward may be provided and the inclined surface portion 50 may be held by the caulking portion 14a.

This application claims priority on Japanese Patent Application No. 2006-90167, filed on Mar. 29, 2006 and Japanese Patent Application No. 2006-257112, filed on Sep. 22, 2006, the contents of which are incorporated herein by reference.

The invention claimed is:

1. A driving-wheel supporting hub unit comprising:
   a hub, comprising:
   a flange for supporting a vehicle wheel at an axially outer end of the hub,
   a first inner ring raceway at an axially intermediate portion of the hub, and
   a first small-diameter stepped portion at an axially inner end of the hub, an outer diameter of the first small-diameter stepped portion being smaller than an outer diameter of the first inner ring raceway;
   an inner ring fitted to the first small-diameter stepped portion, the inner ring comprising:
   a second inner ring raceway formed at an outer circumferential surface of the inner ring,
   a large-diameter stepped portion comprising an inner diameter larger than a diameter of an axially intermediate portion of an inner circumferential surface of the inner ring, located at an axially inner end of the inner circumferential surface of the inner ring,
   a stepped surface located between the axially intermediate portion of the inner circumferential surface and the large-diameter stepped portion;
   an outer ring comprising:
   a first outer ring raceway facing the first inner ring raceway, and
   a second outer ring raceway facing the second inner ring raceway formed at an inner circumferential surface of the outer ring; and
   a plurality of rolling elements provided between the first and second inner ring raceways and the first and second outer ring raceways, respectively;
   wherein the stepped surface of the inner ring is held by a caulking portion formed by plastically deforming a cylindrical portion radially outward, the cylindrical portion being provided at the axially inner end of the hub, whereby the inner ring is coupled with and fixed to the hub and an axially inner end surface of the inner ring is made to project further axially inward than an axially inner end surface of the caulking portion,
   wherein a second small-diameter stepped portion is provided at an axially inner end of an outer circumferential surface of the cylindrical portion, an outer diameter of the second small-diameter stepped portion being smaller than the outer diameter of the first small-diameter stepped portion, and an axially outer end of the second small-diameter portion being located axially outward from a chamfered portion connecting the stepped surface of the inner ring and the axially intermediate portion of the inner circumferential surface of the inner ring,
   wherein the caulking portion is formed by pressing a pressing die axially toward the hub without rocking the pressing die with respect to the hub while an annular working surface provided in a portion of the pressing die is pressed against an axially inner end edge of the cylindrical portion over a whole periphery of the cylindrical portion, under temperature conditions of cold working, thereby plastically deforming the cylindrical portion radially outward along the working surface simultaneously over the whole periphery thereof, and wherein after forming, an outer circumferential edge of the caulking portion does not contact an inner circumferential surface of the large-diameter stepped portion.

2. A driving-wheel supporting hub unit comprising:

a hub comprising:

a flange for supporting a vehicle wheel at an axially outer end of the hub, a first inner ring raceway at an axially intermediate portion of the hub, and a first small-diameter stepped portion at an axially inner end of the hub, an outer diameter of the small-diameter stepped portion being smaller than an outer diameter of the first inner ring raceway;

an inner ring fitted to the first small-diameter stepped portion, the inner ring comprising:

a second inner ring raceway formed at an outer circumferential surface of the inner ring, a large-diameter stepped portion comprising an inner diameter larger than a diameter of an axially intermediate portion of an inner circumferential surface of the axially inner ring, located at an inner end of the inner circumferential surface of the inner ring, a stepped surface located between the axially portion of the inner circumferential surface and the large-diameter stepped portion;

an outer ring comprising:

a first outer ring raceway facing the first inner ring raceway, and a second outer ring raceway facing the second inner ring raceway formed at an inner circumferential surface of the outer ring;

a plurality of rolling elements provided between the first and second inner ring raceways and the first and second outer ring raceways, respectively;

wherein the stepped surface of the inner ring is held by a caulking portion formed by plastically deforming a cylindrical portion radially outward, the cylindrical portion being provided at the axially inner end of the hub, whereby the inner ring is coupled with and fixed to the hub and an axially inner end surface of the inner ring is made to project further axially inward than an inner end surface of the caulking portion, wherein a second small-diameter stepped portion is formed at an axially inner end of an outer circumferential surface of the cylindrical portion such that an axially outer end of the second small-diameter portion comprises an annular concave curved surface in a circular arc section, an outer diameter of the second small-diameter stepped portion being smaller than the outer diameter of the first small-diameter stepped portion, and the axially outer end of the second small-diameter portion being located axially outward from a chamfered portion connecting the stepped surface of the inner ring and the axially intermediate portion of the inner circumferential surface of the inner ring, and wherein the caulking portion is formed by pressing a pressing die axially toward the hub without rocking the pressing die with respect to the hub while an annular working surface provided in a portion of the pressing die is pressed against an axially inner end edge of the cylindrical portion over a whole periphery of the cylindrical portion, under temperature conditions of cold working, thereby plastically deforming the cylindrical portion radially outward along the working surface simultaneously over the whole periphery thereof.

* * * * *